United States Patent
Crostic, Jr.

(10) Patent No.: US 9,216,560 B2
(45) Date of Patent: Dec. 22, 2015

(54) REFLECTIVE INSULATION PRODUCTS AND METHODS FOR MANUFACTURING THE SAME

(75) Inventor: William H. Crostic, Jr., Simpsonville, SC (US)

(73) Assignee: Silvercote, LLC, Greer, SC (US)

( * ) Notice: Subject to any disclaimer, the term of this patent is extended or adjusted under 35 U.S.C. 154(b) by 1378 days.

(21) Appl. No.: 12/497,203

(22) Filed: Jul. 2, 2009

(65) Prior Publication Data

US 2010/0003491 A1 Jan. 7, 2010

Related U.S. Application Data

(60) Provisional application No. 61/077,706, filed on Jul. 2, 2008.

(51) Int. Cl.
| | |
|---|---|
| *E04B 1/74* | (2006.01) |
| *B32B 37/15* | (2006.01) |
| *B32B 15/14* | (2006.01) |
| *B32B 15/20* | (2006.01) |

(Continued)

(52) U.S. Cl.
CPC ............... *B32B 37/15* (2013.01); *B32B 15/14* (2013.01); *B32B 15/20* (2013.01); *B32B 17/04* (2013.01); *B32B 27/32* (2013.01); *B32B 27/36* (2013.01); *B32B 29/02* (2013.01); *E04B 1/7658* (2013.01); *E04D 13/1618* (2013.01); *B29C 44/04* (2013.01); *B29K 2075/00* (2013.01); *B29K 2995/0016* (2013.01); *B32B 37/1027* (2013.01); *B32B 2262/101* (2013.01); *B32B 2305/022* (2013.01); *B32B 2305/22* (2013.01); *B32B 2307/304* (2013.01); *B32B 2307/3065* (2013.01); *B32B 2307/416* (2013.01); *B32B 2309/105* (2013.01); *B32B 2311/24* (2013.01); *B32B 2315/08* (2013.01); *B32B 2367/00* (2013.01); *B32B 2607/00* (2013.01); *E04B 2001/7691* (2013.01); *Y10T 428/31551* (2015.04); *Y10T 428/31587* (2015.04); *Y10T 428/31605* (2015.04); *Y10T 442/10* (2015.04)

(58) Field of Classification Search
CPC ........ B32B 17/02; B32B 17/04; B32B 37/15; B32B 27/36; B32B 27/32; B32B 29/02; B32B 15/20; B32B 15/14; B32B 2262/101; B32B 2315/08; B32B 2311/24; B32B 2307/304; B32B 2607/00; B32B 2367/00; B32B 2309/105; B32B 2305/22; B32B 2307/416; B32B 2305/022; B32B 2307/306; E04D 13/1618; E04B 1/7658; E04B 2001/7691; Y10T 428/31551; Y10T 428/31605; Y10T 442/10; Y10T 428/31587; B29K 2995/0016; B29K 2075/00
USPC ................................... 442/31, 33, 35, 38, 41
See application file for complete search history.

(56) References Cited

U.S. PATENT DOCUMENTS 5,108,798 A * 4/1992 Guerro et al. ............. 427/389.8
6,093,481 A * 7/2000 Lynn et al. .................... 428/217

(Continued)

*Primary Examiner* — Elizabeth M Cole
(74) *Attorney, Agent, or Firm* — Barnes & Thornburg LLP

(57) ABSTRACT

In accordance with one embodiment of the present disclosure, a reflective insulation product is provided. The product includes a first outer layer having reflective material, a second outer layer, and an inner layer. The inner layer includes fiberglass and urethane, the urethane being present in an amount of at least about 5% by weight. The inner layer is positioned between the first outer layer and second outer layer such that the first outer layer is adhered to a first side of the inner layer by the urethane and the second outer layer is adhered to a second side of the inner layer by the urethane.

18 Claims, 2 Drawing Sheets

(51) Int. Cl.
*B32B 17/04* (2006.01)
*B32B 27/32* (2006.01)
*B32B 27/36* (2006.01)
*B32B 29/02* (2006.01)
*E04B 1/76* (2006.01)
*E04D 13/16* (2006.01)
*B29C 44/04* (2006.01)
*B29K 75/00* (2006.01)
*B32B 37/10* (2006.01)

(56) References Cited

U.S. PATENT DOCUMENTS

| | | |
|---|---|---|
| 6,797,356 B2 | 9/2004 | Zupon et al. |
| 2005/0229518 A1* | 10/2005 | Ruid et al. .................. 52/404.1 |
| 2005/0284065 A1* | 12/2005 | Shaffer ........................ 52/404.1 |
| 2007/0259155 A1 | 11/2007 | Zupon et al. |

\* cited by examiner

REFLECTIVE INSULATION PRODUCTS AND METHODS FOR MANUFACTURING THE SAME

RELATED APPLICATIONS

The present application is based upon and claims priority to a U.S. Provisional application having Ser. No. 61/073,655 filed on Jun. 18, 2008.

BACKGROUND

Radiation is the transfer of heat or energy from a hot surface to a cold surface through air or a vacuum. For example, radiant heat from the sun travels through space and strikes the roof of a building and exterior walls of a building, causing the roof and exterior walls of the building to increase in temperature. Heat flows from the outer surface of the roof and exterior walls of the building to inner surfaces of the roof and the walls of the building through conduction. If the inner surfaces of the roof and walls of the building are warmer than surfaces inside the building that are spaced apart from the roof and inner walls of the building, heat will radiate from the inner surfaces of the roof and the walls of the building to the surfaces inside the building. Radiation between surfaces inside a building occurs through invisible infrared heat rays.

Heat can also exit a building through radiation. In winter months, surfaces inside a building are often warmer than the inner surfaces of the walls and the roof of the building. Warmer surfaces inside the building radiate heat to the inner surfaces of the walls and the roof of the building, causing them to increase in temperature. This heat flows from the inner surfaces of the walls and the roof of the building to the outer surface of the walls and roof of the building through conduction.

The ability of a material to emit radiant energy and absorb radiant energy is defined by the materials emissivity and reflectivity. The lower the emissivity of a material, the lower the amount of heat that is radiated from its surface. The higher the reflectivity of the material, the higher the percentage of incident radiant heat that is reflected from the material's surface. Radiant barriers and reflective insulation systems reduce radiant heat transfer between surfaces across open spaces, which is a significant contributor to heat gain during warm months and heat loss during cold months. Radiant barriers are a single layer of reflective material spaced apart from a surface which radiates heat. Radiant barriers do not prevent heat on one side of the reflected material from being conducted to the second side of the reflective material. Reflective insulation systems are typically laminate products that reduce heat transferred due to radiation, as well as convection. Reflective insulation systems typically include a reflective layer and a conduction preventing layer. The conduction preventing layer prevents heat on the reflective layer of the reflective insulation system from being conducted to the second side of the reflective insulation system.

Reflective insulation systems are installed such that a reflective layer is spaced apart from the roof decking or the outer wall of a building. Heat that is radiated inward from the roof or outer walls of the building is reflected off the reflective layer of the reflective insulation system back to the roof or outer surface of the building. The temperature of the roof or outer surface of the building increases rather than the interior of the building.

In winter applications, heat radiated by surfaces in the interior of the building are reflected back into the interior of the building if a reflective layer is included that faces the interior of the building. By reflecting radiant heat from the roof and external walls of the building back to the roof and outer walls of the building the heat that enters the building is reduced during warm months. By reflecting the heat radiated by the interior surfaces of the building back to the interior surfaces of the building, the heat that escapes from the building is reduced during cold months.

Numerous reflective insulation products are currently available. However, a need continues to exist for methods of forming reflective insulation products that are efficient and cost-effective. Reflective insulation products formed by utilizing such methods would be particularly beneficial.

SUMMARY

Objects and advantages of the invention will be set forth in part in the following description, or may be obvious from the description, or may be learned through practice of the invention.

In accordance with one embodiment of the present disclosure, a reflective insulation product is provided. The product includes a first outer layer having reflective material, a second outer layer, and an inner layer. The inner layer includes fiberglass and urethane, the urethane being present in an amount of at least about 5% by weight. The inner layer is positioned between the first outer layer and second outer layer such that the first outer layer is adhered to a first side of the inner layer by the urethane and the second outer layer is adhered to a second side of the inner layer by the urethane.

In yet another embodiment of the present disclosure, a reflective insulation product is provided. The product includes a first outer layer having reflective material, a second outer layer, and an inner layer. The inner layer includes fiberglass and urethane, the urethane being present in an amount of at least about 5% by weight. At least a portion of the fibers of the fiberglass are opened to increase their surface area, the fiberglass being present in an amount of from about 80% to about 99% by weight. The inner layer is positioned between the first outer layer and second outer layer such that the first outer layer is adhered to a first side of the inner layer by the urethane and the second outer layer is adhered to a second side of the inner layer by the urethane. The first outer layer, second outer layer, and inner layer having a combined thickness of from about 0.15 to about 0.30 inches In still another embodiment of the present disclosure, a method of making a reflective insulation product is described. The method includes adding urethane to fiberglass, the urethane being present in an amount of at least about 5% by weight, contacting the urethane and fiberglass with a first outer layer, the first outer layer having reflective material, contacting the urethane and fiberglass with a second outer layer, compressing the urethane and fiberglass between the first outer layer and second outer layer, the urethane and fiberglass being positioned between the first outer layer and second outer layer to form an inner layer, and allowing the first outer layer to adhere to a first side of the inner layer by the urethane and the second outer layer to adhere to a second side of the inner layer by the urethane.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figure in which.

Figure 1A:
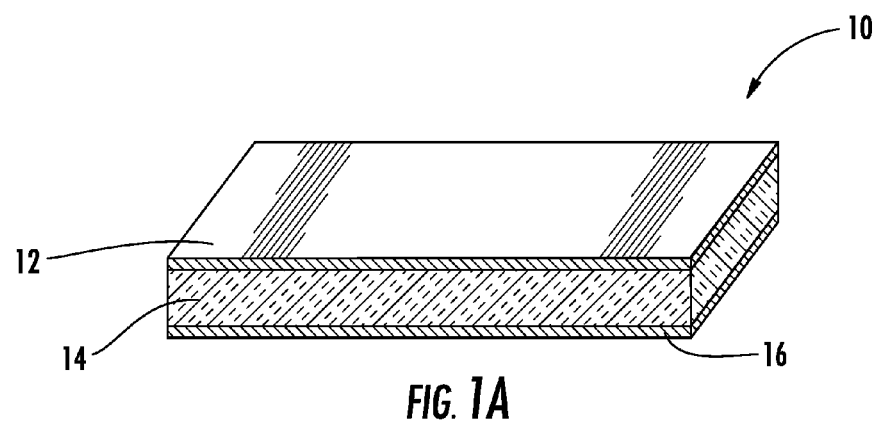
FIG. 1A is a perspective view of a reflective insulation product in accordance with certain embodiments of the present disclosure.

Repeat use of reference characters in the present specification and drawings is intended to represent same or analogous features or elements of the disclosure.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure is generally directed to methods for making reflective insulation products. The methods described herein greatly simplify the process for making such products. In addition, the present disclosure describes a reflective insulation product having advantages over conventional products.

For instance, it has been determined that urethane can be mixed with fiberglass during manufacture of the reflective insulation products described herein. The urethane can coat portions of the fiberglass so as to form a urethane layer on the fiberglass. The urethane can advantageously serve to adhere outer layers to the fiberglass to more efficiently and cost-effectively form the reflective insulation products of the present disclosure.

Figure 1B:
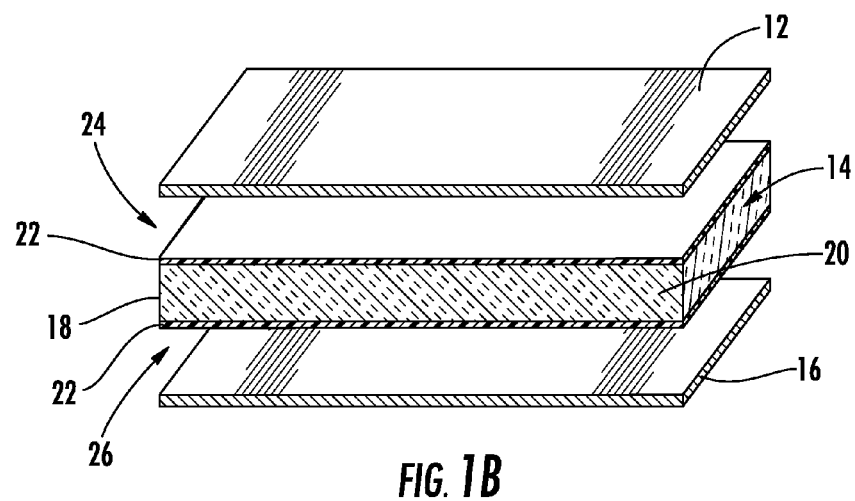
FIG. 1B is a exploded perspective view of a reflective insulation product in accordance with certain embodiments of the present disclosure.

Referring to FIGS. 1A and 1B, a reflective insulation product 10 in accordance with certain embodiments of the present disclosure is illustrated. The reflective insulation product 10 includes a first outer layer 12, an inner layer 14, and a second outer layer 16.

The first outer layer 12 can be made from any suitable reflective material. An example of a suitable reflective material is aluminum. The first outer layer 12 can include an exterior surface that is made from reflective material. For example, the first outer layer 12 can be a laminate that includes an exterior surface made from a reflective material.

In certain embodiments, the first outer layer 12 is a laminate that includes a layer of aluminum foil adhered to a film by an adhesive. The film can be selected from suitable materials as would be known in the art such as polyester film and the adhesive can be any suitable adhesive, such as a flame resistant adhesive. The aluminum foil of the laminate can be from about 0.0001 to about 0.0005 inches thick and the film can be from about 0.00030 to about 0.00050 inches thick. When utilized, polyester film can strengthen the first outer layer 12, preventing it from being torn easily. Further, when the adhesive used to adhere the laminate together is flame resistant, the first outer layer 12 is resistant to flame spread and smoke development when the material is burned. An example of an acceptable first outer layer 12 is Cleveland Laminating's 8910 foil/polyester facing.

The second outer layer 16 can be formed from any suitable material. In certain embodiments, the second outer layer 16 is made from a vapor retarding material. In certain embodiments, the second outer layer 16 includes an exterior surface that is made from a suitable reflective material, such as aluminum. For example the second outer layer 16 can be a laminate that includes a layer of aluminum foil, a layer of scrim material, and a layer of kraft material. The layer of scrim can be a tri-directional fiberglass that reinforces the second outer layer 16. The kraft material can be bonded to the scrim material and the foil by an adhesive, such as a flame resistant adhesive. An example of an acceptable second outer layer 16 is Lamtec Corporation's R-3035 material.

In certain embodiments, the second outer layer 16 includes an outer plastic surface such as polypropylene. The second outer layer 16 can be a laminate that includes a polypropylene layer, a scrim material layer, and a kraft material layer. The polypropylene layer can be bonded to the reinforcing scrim material layer and the kraft material layer by an adhesive, such as a flame-resistant adhesive. Any suitable polypropylene layer can be utilized. For instance, in certain embodiments, the polypropylene layer is a white film that is from about 0.0010 to about 0.0020 inches thick. An example of an acceptable polypropylene vapor barrier layer is Lamtec Corporation's WMP-VR polypropylene/scrim/kraft facing material.

The inner layer 14 is positioned between the first outer layer 12 and the second outer layer 16. The inner layer 14 includes fiberglass 18. The fiberglass 18 can include fibers having a diameter of from about 1 micron to about 10 microns, more particularly having a diameter from about 3.5 microns to about 6.4 microns. In addition, the fiberglass can include fibers having a length of from about 0.10 inches to about 0.30 inches. However, it should be readily apparent to those skilled in the art that fiberglass insulation having fibers with different diameters or thicknesses can be utilized with the present disclosure. An example of an acceptable fiberglass is loose-fill fiberglass insulation sold by Guardian Fiberglass, Inc. Additionally, at least a portion of the fibers of the fiberglass can be opened to increase their surface area. However, it should be understood that other insulation products such as rock wool, cellulosic fiber, and the like are also contemplated for use in the present disclosure and can be substituted for fiberglass in the methods and products described herein.

In certain embodiments, the fiberglass is present in an amount of from about 80% to about 99% by weight of the inner layer 14, more particularly the fiberglass is present in an amount from about 90% by weight to about 99% by weight.

The inner layer 14 also includes urethane 20. The urethane can be an flame-retardant urethane. The urethane can be an elastomeric urethane solid or foam. The urethane 20 can be mixed within the fiberglass 18 of the inner layer 14. The urethane 20 can also coat portions of the fiberglass 18 of the inner layer 14 so as to form a urethane layer 22 on the fiberglass 18. In this regard, it has been advantageously determined that the urethane can serve to adhere the first outer layer 12 to a first side 24 of the inner layer 14 and the second outer layer 16 to a second side 26 of the inner layer 14.

In certain embodiments, the urethane is present in an amount of at least about 5% by weight. For instance, the urethane can be present in an amount from about 5% by weight to about 50% by weight. In certain embodiments, the urethane can be present in an amount of less than about 50% by weight of the inner layer 14, more particularly the urethane can be present in an amount less than about 30% by weight or less than about 20% by weight.

The inner layer 14 can also include other components. For instance, in certain embodiments, blowing agents can be present in the inner layer.

The combined thickness of the first outer layer, second outer layer, and inner layer can be from about 0.10 to about 0.40 inches, more particularly the thickness can be from about 0.15 to about 0.30 inches, still more particularly the thickness can be from about 0.20 to about 0.30 inches.

Figure 2:
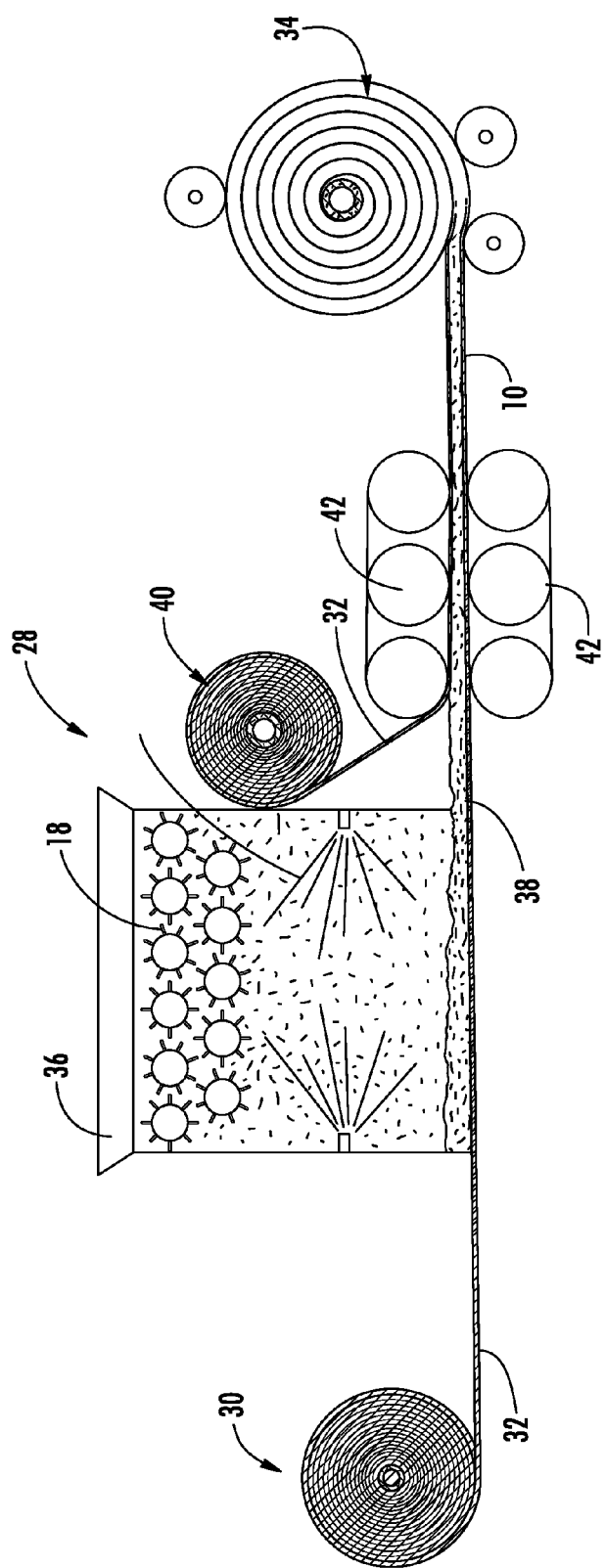
FIG. 2 is a schematic view of a system that can be used in accordance with certain embodiments of the present disclosure.

Referring to FIG. 2, certain embodiments of a method of making a reflective insulation product will now be described. An apparatus 28 for making the reflective insulation product 10 of the present disclosure is schematically depicted in FIG. 2. The apparatus 28 includes a first roll 30 of material for an outer layer 32. The apparatus 28 unrolls an outer layer 32 from the first roll 30 where it passes through various processing steps before being optionally rewound by a rewinding roll 34.

Loose fill fiberglass 18 is gravity fed onto an outer layer 32 through a gravity feed chute 36. As the fiberglass 18 passes through the gravity feed chute 36, urethane 20 is added to the fiberglass 18. The urethane 20 can be misted, sprayed, or otherwise added to the fiberglass 18 as it is falling through the gravity feed chute 36. Alternatively, or in addition to the urethane added above, urethane 20 can be coated on an outer layer 32 and/or fiberglass 18 once it has come into contact with an outer layer 32. In addition, other components can also be optionally added to fiberglass 18. The fiberglass 18 forms a substrate layer 38 on an outer layer 32 with the urethane potentially coating and/or permeating the substrate layer 38. In certain embodiments, the fiberglass 18 can be opened prior to being fed through the gravity feed chute 36 in order to increase the surface area of the substrate layer 38.

The apparatus 28 includes a second roll 40 of material for an outer layer 32. The apparatus 28 unrolls an outer layer 32 from the second roll 40 where it contacts the substrate layer 38 and enters a series of compression rollers 42 with the substrate layer 38 and outer layer 32. The substrate layer 38 is compressed between the outer layers 32 to form the reflective insulation product 10. The outer layers 32 can each adhere to respective sides of the substrate layer 38 by the urethane 20.

The reflective insulation 10 can be moved over supporting rollers 44 for further processing. For instance, the reflective insulation can subjected to a perforating roller. The perforating roller can include a plurality of spikes along its axial length in the exemplary embodiment. As the reflective insulation 10 moves past the perforating roller the spikes that extend from the perforating roller can perforate an outer layer to form perforations in an outer layer. Such perforations can allow air trapped between the outer layers to escape from the reflective insulation 10 as it is rolled onto a reflective insulation roll.

The reflective insulation product described herein can be utilized to form a variety of different insulation products. For instance, in certain embodiments, the product can be utilized for batts, blankets, or other insulation products as would be known in the art.

The reflective insulation product 10 of the present disclosure can be installed in a roof of a building. In certain embodiments, the reflective insulation 10 is installed on the purlins by orienting a roll of reflective insulation perpendicular to the purlins and unrolling the reflective insulation across the purlins. The reflective insulation is allowed to sag between the purlins, such that there is a gap between the roof panels and the reflective insulation 10. The reflective insulation is held in place by the roof panels when they are secured to the purlins.

In certain embodiments, the edges of the reflective insulation product 10 are secured to purlins. The edges of the reflective insulation product 10 can be secured to the purlins by being sandwiched between a roof panel and the purlins, or they may be secured to the purlins by double-sided tape. The reflective insulation product 10 sags between the purlins, creating a space between the reflective insulation product 10 and the roof panel.

When the roof panel is warmer than an outer layer of the reflective insulation product 10, the roof panel radiates heat to the outer layer. If the outer layer is a reflective layer, the reflective layer reflects a large percentage of the radiated heat back to the roof panel.

When an interior surface of the building is warmer than an outer layer of the reflective insulation product, the interior surface radiates heat to the outer layer which can reflect at least a portion of the radiated heat back toward surfaces inside the building. The amount of heat radiated back toward surfaces inside the building varies depending on the type of outer layer that is used. For instance, a vapor barrier layer having an outer layer that is made from a reflective aluminum material can reflect more of radiated heat back towards the interior of a building than a vapor barrier having an outer surface that is white polypropylene.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims.

What is claimed is:

1. A reflective insulation product comprising:
   a first outer layer comprising reflective material;
   a second outer layer; and
   an inner layer comprising fiberglass and urethane, the inner layer being formed by spray means in a chute spraying urethane into loose fill fiberglass falling in the chute, the urethane being present in an amount of at least about 5% by weight, the inner layer being positioned between the first outer layer and second outer layer such that the urethane is mixed within the fiberglass of the inner layer and urethane coats, portions of the fiberglass of the inner layer to form a urethane layer on the fiberglass whereby the first outer layer is adhered to a first side of the inner layer by the urethane and the second outer layer is adhered to a second side of the inner layer by the urethane, wherein the first outer layer, second outer layer, and inner layer have a combined thickness of from about 0.15 to about 0.30 inches.

2. The reflective insulation product of claim 1, wherein the reflective material of the first layer comprises aluminum.

3. The reflective insulation product of claim 1, wherein the second outer layer comprises white polypropylene.

4. The reflective insulation product of claim 3, wherein the second outer layer comprises scrim material.

5. The reflective insulation product of claim 1, wherein the second outer layer comprises aluminum.

6. The reflective insulation product of claim 1, wherein the second outer layer is a laminate comprising a layer of polypropylene, a layer of scrim material, and a layer of kraft material.

7. The reflective insulation product of claim 1, wherein the inner layer comprises from about 80% to about 99% by weight fiberglass.

8. The reflective insulation product of claim 1, wherein at least a portion of the fibers of the fiberglass are opened to increase their surface area.

9. A reflective insulation product comprising:
   a first outer layer comprising reflective material;
   a second outer layer; and
   an inner layer comprising fiberglass and urethane, the inner layer being formed by spraying a mist of urethane into loose fill fiberglass falling in a chute, at least a portion of the fibers of the fiberglass being opened to increase their surface area, the fiberglass being present in an amount of from about 80% to about 99% by weight, the urethane being present in an amount of at least about 5% by weight, the inner layer being positioned between the first outer layer and second outer layer such that the urethane is mixed within the fiberglass of the inner layer and coats portions of the fiberglass of the inner layer to form a urethane layer on the fiberglass whereby the first outer layer is adhered to a first side of the inner layer by the urethane and the second outer layer is adhered to a second side of the inner layer by the urethane, the first outer layer, second outer layer, and inner layer having a combined thickness of from about 0.20 to about 0.30 inches.

10. The reflective insulation product of claim 9, wherein the reflective material of the first layer comprises aluminum.

11. The reflective insulation product of claim 9, wherein the second outer layer comprises white polypropylene.

12. The reflective insulation product of claim 11, wherein the second outer layer comprises scrim material.

13. The reflective insulation product of claim 9, wherein the second outer layer comprises aluminum.

14. The reflective insulation product of claim 9, wherein the second outer layer is a laminate comprising a layer of polypropylene, a layer of scrim material, and a layer of kraft material.

15. A method of making a reflective insulation product comprising:
   adding urethane to fiberglass by spraying urethane into falling loose fill fiberglass, the urethane being present in an amount of at least about 5% by weight, wherein the urethane is mixed within the fiberglass and coats portions of the fiberglass to form a urethane layer on the fiberglass;
   contacting the urethane and fiberglass with a first outer layer, the first outer layer comprising reflective material;
   contacting the urethane and fiberglass with a second outer layer;
   compressing the urethane and fiberglass between the first outer layer and second outer layer, the urethane and fiberglass being positioned between the first outer layer and second outer layer to form an inner layer; and
   allowing the first outer layer to adhere to a first side of the inner layer by the urethane and the second outer layer to adhere to a second side of the inner layer by the urethane, wherein the first outer layer, second outer layer, and inner layer have a combined thickness of from about 0.20 to about 0.30 inches.

16. A method as in claim 15, wherein the second outer layer comprises white polypropylene.

17. A method as in claim 15, wherein the second outer layer comprises aluminum.

18. A method as in claim 15, further comprising opening at least a portion of the fibers of the fiberglass to increase their surface area prior to adding the urethane to the fiberglass.

* * * * *